(12) United States Patent
Palmquist

(10) Patent No.: US 12,709,069 B2
(45) Date of Patent: Aug. 18, 2026

(54) METHOD FOR PRODUCING PACKAGES, AN APPARATUS AND A KIT OF PARTS

(71) Applicant: Tetra Laval Holdings & Finance S.A., Pully (CH)

(72) Inventor: Patrik Palmquist, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 18/851,243

(22) PCT Filed: Apr. 17, 2023

(86) PCT No.: PCT/EP2023/059911

§ 371 (c)(1),
(2) Date: Sep. 26, 2024

(87) PCT Pub. No.: WO2023/208628

PCT Pub. Date: Nov. 2, 2023

(65) Prior Publication Data

US 2025/0196446 A1 Jun. 19, 2025

(30) Foreign Application Priority Data

Apr. 25, 2022 (EP) .................................... 22169797

(51) Int. Cl.
*B29C 65/10* (2006.01)
*B29C 65/00* (2006.01)
(Continued)

(52) U.S. Cl.
CPC ........ *B29C 65/103* (2013.01); *B29C 66/0384* (2013.01); *B65B 9/20* (2013.01); *B29L 2031/7166* (2013.01)

(58) Field of Classification Search
CPC ......... B65B 9/20; B65B 9/2021; B65B 51/20; B29C 65/103; B29C 66/0384; B29L 2031/7166
(Continued)

(56) References Cited

U.S. PATENT DOCUMENTS 3,314,591 A * 4/1967 Cheeley .................... B65B 9/20 426/410
5,806,277 A * 9/1998 Scheifele et al. ............................ B29L 2031/7166 156/499
(Continued)

FOREIGN PATENT DOCUMENTS

EP 0955151 A1 11/1999
EP 3967476 A1 3/2022
WO WO-9951421 A1 * 10/1999 ...... B29L 2031/7166

OTHER PUBLICATIONS

International Search Report mailed Jun. 21, 2023, for International Application No. PCT/EP2023/059911.

*Primary Examiner* — Patrick D Maines
(74) *Attorney, Agent, or Firm* — Lawrence S. Drasner

(57) ABSTRACT

A method for producing packages is presented. The method comprises providing a web of packaging material comprising at least an outer protective layer, a cellulose-based mid-layer and an inner protective layer, providing a protective strip, heating a first longitudinal edge section of an inside surface of the web by applying a first flow of heated air via a first nozzle, heating a first longitudinal edge section of an outside surface of the protective strip by applying a second flow of heated air via a second nozzle, attaching the outside surface of the first longitudinal edge section of the protective strip onto the inside surface of the first longitudinal edge section of the web, forming a tube of the web of packaging material, attaching an outside surface of the first
(Continued)

longitudinal edge section of the web onto an inside surface of the second longitudinal edge section of the web, attaching an inside surface of a second longitudinal section of the protective strip onto an outside surface of a mid-section of the web, filling the food product into the tube, sealing the tube transversally in transversal sealing sections in a lower end of the tube, and cutting the tube in the transversal sealing sections such that the packages are formed.

15 Claims, 10 Drawing Sheets

(51) Int. Cl.
*B29L 31/00* (2006.01)
*B65B 9/20* (2012.01)

(58) Field of Classification Search
USPC ......................... 53/451, 551, 375.9; 156/497
See application file for complete search history.

(56) References Cited

U.S. PATENT DOCUMENTS 5,916,413 A * 6/1999 Johnson et al. ...... B29C 65/103 156/499
2004/0026029 A1* 2/2004 Martin et al. ........... B65B 51/20 156/499

* cited by examiner

METHOD FOR PRODUCING PACKAGES, AN APPARATUS AND A KIT OF PARTS

TECHNICAL FIELD

The invention generally relates to packaging technology. More particularly, it is related to methods and apparatuses for attaching a protective strip over a longitudinal sealing.

BACKGROUND ART

Today, roll-fed packaging machines are commonly used for producing packages holding liquid food products. An advantage of using roll-fed packaging machines is speed. By continuously feed packaging material, folding this into a tube, filling food product into the tube, and sealing and cutting the tube in a lower end, food packages can be produced at impressive speed, e.g. 30 000 packages per hour. In addition to the impressive speed of roll-fed packaging machines, by having the food product held in the tube, unwanted microorganisms can efficiently be hindered from coming in contact with the food product. In this way it is made possible to produce so-called aseptic packages, that is, packages that can hold food products, such as UHT-treated milk, for several months in room temperature.

To achieve packages that can protect the food product for several months, several aspects must be considered. For instance, microorganisms should be hindered from coming in contact with the food product and sun light should be blocked out from reaching the food product, since this may deteriorate the food product. In addition, measures should be made for assuring that the packages can stand for several months. For instance, for carton packages, a protective strip, sometimes referred to as longitudinal sealing (LS) strip, can be applied inside the tube over the longitudinal sealing to provide for that the food product is hindered from coming in contact with a carton layer of the packaging material, thereby avoiding that this is dissolved by the food product.

Applying the protective strip onto the inside of the tube is today common practice for roll-fed carton packaging machines. To apply the protective strip, usually a polymer-based strip, this and the packaging material is first heated such that the protective strip and an inner plastic layer of the packaging material melt, and, secondly, the two are pressed together such that they adhere to each other.

To provide for that the protective strip adheres to both sides of the longitudinal sealing, part of the protective strip can first be attached to a first longitudinal edge of a web of packaging material and once this has been formed into the tube, the other part of the protective strip can be attached to the inside of the tube such that the joint of the tube, that is, the longitudinal sealing, is covered by the protective strip from an inside of the tube.

Even though application of protective strips has been used for many years and the technology behind has been developed and refined over the years, there is a need to further improve this process. For instance, by applying heat to melt the inner plastic layer of the packaging material, the packaging material is affected. By being able to reduce the impact of heat on the packaging material during the protective strip application, the risk that the packaging material is affected to the extent that defective packages are produced can be reduced. In addition, by being able to control this process in more detail, less heat is needed, which is positive from an environmental standpoint. Further, it is made possible to reduce the thickness of the different layers of the packaging material as well as the thickness of the protective strip, which is also environmentally beneficial.

SUMMARY

It is an object of the invention to at least partly overcome one or more of the above-identified limitations of the prior art. In particular, it is an object to present a protective strip application process providing reliable adherence of the strip while reducing a risk of overheating the packaging material. A further object is to provide for that less material is needed for providing food safe packages.

According to a first aspect, it is provided a method for producing packages holding a food product, said method comprising

- providing a web of packaging material comprising at least an outer protective layer, a cellulose-based mid-layer and an inner protective layer,
- providing a protective strip,
- heating a first longitudinal edge section of an inside surface of the web by applying a first flow of heated air via a first nozzle,
- heating a first longitudinal edge section of an inside surface of the protective strip by applying a second flow of heated air via a second nozzle,
- attaching the outside surface of the first longitudinal edge section of the protective strip onto the inside surface of the first longitudinal edge section of the web,
- forming a tube of the web of packaging material by directing the first longitudinal edge section of the web inside a second longitudinal edge section of the web,
- attaching an outside surface of the first longitudinal edge section onto an inside surface of the second longitudinal edge section,
- attaching an inside surface of a second longitudinal section of the protective strip onto an outside surface of a mid-section of the web, wherein the mid-section is placed between the first and second edge sections, thereby providing for that the food product is hindered from coming into contact with the cellulose-based mid-layer of the packaging material,
- filling the food product into the tube,
- sealing the tube transversally in transversal sealing sections in a lower end of the tube, and
- cutting the tube in the transversal sealing sections such that the packages are formed.

An advantage of heating the web by the first flow and the strip via the second flow is that individual heating of the two can be achieved. This provides for that a risk of over-heating can be reduced, resulting in that a risk of blisters being formed in the packaging material can be reduced, and that a risk of delamination in the packaging material can be reduced.

The individual heating also comes with the benefit that the strip and the web can be optimized for the sake of the strip application process individually. As an effect, it is made possible to use less material and/or material with lower carbon footprint, but still provide reliable food packages.

The first flow of heated air may have a first temperature, and the second flow of heated air has a second temperature, wherein the first temperature may be adjusted in accordance with properties of the packaging material, and the second temperature may be adjusted in accordance with properties of the protective strip.

The first temperature may be in the range 50 to 90 degrees Celsius and/or the second temperature may be in the range 70 to 250 degrees Celsius.

The first flow of heated air provided via the first nozzle may be directed in a first flow direction and the second flow of heated air provided via the second nozzle may be directed in a second flow direction, and the first and second flow directions may be diverted at least 90 degrees.

By having the first and second flow directions diverted 90 degrees or more, it is made possible to ensure individual heating of the web and the strip.

The first flow of heated air has a first volumetric flow rate, and the second flow of heated air has a second volumetric flow rate, wherein the first volumetric flow rate may be adjusted in accordance with properties of the packaging material, and the second volumetric flow rate may be adjusted in accordance with properties of the protective strip.

An advantage with having different volumetric flow rates in the first and second nozzle is that the heated air may be supplied from the same source, but that different heating is achieved by different volumetric flow rates.

The web of packaging material may further comprise a barrier layer arranged between the outer protective layer and the inner protective layer, wherein the barrier layer may provide for that oxygen is hindered from passing through the packaging material into the food product, wherein the first temperature of the first flow and/or the first volumetric flow rate may be adjusted such that negative impact on the barrier layer is prevented.

Since disturbances of the barrier layer could result in loss of quality of the food produced held in the package, measures should be taken to assure that the integrity of barrier layers is maintained. By heating the strip and the web individually in combination with that the first flow and/or the first volumetric flow rate is chosen such that the barrier layer is not impaired, and it is made possible to produce packages with good quality and yet provide an individually adjusted heating of the strip.

The first and second temperature and/or the first and second volumetric flow rate may be set based on measured humidity level, measured pressure and/or measured temperature in surrounding air.

An advantage of taking into account the humidity level, the pressure and/or the temperature of the surrounding air is that the heating of the strip and/or the web can be dynamically set based on the specific conditions provided at the place of the heating arrangement. Thus, by both individually heat the strip and the web and also adjust based on the measurements made on the surrounding air, an even more reliable heating can be achieved with even less negative effects on the packaging material.

According to a second aspect, it is provided an apparatus for producing package holding a food product, said apparatus comprising

- a web holder arranged to hold a web of packaging material comprising at least an outer protective layer, a cellulose-based mid-layer and an inner protective layer,
- a protective strip holder arrange to hold a protective strip,
- an air heating arrangement comprising a first nozzle and a second nozzle, wherein the first nozzle is arranged to heat a first longitudinal edge section of an inside surface of the web by applying a first flow of heated air, and the second nozzle is arranged to heat a first longitudinal edge section of an outside surface of the protective strip by applying a second flow of heated air via a second nozzle,
- a first strip application arrangement arranged to attach the outside surface of the first longitudinal edge section of the protective strip onto the inside surface of the first longitudinal edge section of the web,
- a tube forming arrangement arranged to form a tube of the web of packaging material by directing the first longitudinal edge section inside a second longitudinal edge section of the web,
- a longitudinal sealing arrangement arranged to seal the web longitudinally by attaching an outside surface of the first longitudinal edge section onto an inside surface of the second longitudinal edge section,
- a second strip application arrangement arranged to attach an inside surface of a second longitudinal edge section of the protective strip onto an outside surface of a mid-section of the web, wherein the mid-section is placed between the first and second edge sections, thereby providing for that the food product is restrained from coming into contact with the cellulose-based mid-layer of the packaging material,
- a food product pipe arranged to fill the food product into the tube,
- a transversal sealing arrangement arranged to seal the tube transversally in transversal sealing sections in a lower end of the tube, and to cut the tube in the transversal sealing sections such that the packages are formed.

The same features and advantages as presented above with respect to the first aspect also applies to this second aspect.

The first flow of heated air may have a first temperature and the second flow of heated air may have a second temperature, wherein the first temperature may be adjusted in accordance with properties of the packaging material, and the second temperature may be adjusted in accordance with properties of the protective strip.

The first flow of heated air provided via the first nozzle may be directed in a first flow direction and the second flow of heated air provided via the second nozzle may be directed in a second flow direction, and the first and second flow directions may be diverted at least 90 degrees.

The first flow of heated air may have a first volumetric flow rate, and the second flow of heated air may have a second volumetric flow rate, wherein the first volumetric flow rate may be adjusted in accordance with properties of the packaging material, and the second volumetric flow rate may be adjusted in accordance with properties of the protective strip.

The web of packaging material may further comprise a barrier layer arranged between the outer protective layer and the inner protective layer, wherein the barrier layer may provide for that oxygen is hindered from passing through the packaging material into the food product, wherein the first temperature of the first flow and/or the first volumetric flow rate may be adjusted to prevent negative impact on the barrier layer as well as on the packages produced.

The first and second temperature and/or the first and second volumetric flow rate may be set based on measured humidity level in surrounding air, measured pressure and/or measured temperature in surrounding air.

According to a third aspect, it is provided a kit of parts arranged to be mounted onto an existing filling machine, said existing filling machine comprising

- a web holder arranged to hold a web of packaging material comprising at least an outer protective layer, a cellulose-based mid-layer and an inner protective layer,
- a protective strip holder arrange to hold a protective strip,
- a first strip application arrangement arranged to attach an outside surface of a first longitudinal edge section of the protective strip onto an inside surface of a first longitudinal edge section of the web, a tube forming arrangement arranged to form a tube of the web of packaging material by directing the first longitudinal edge section inside a second longitudinal edge section of the web, a longitudinal sealing arrangement arranged to seal the web longitudinally by attaching an outside surface of the first longitudinal edge section onto an inside surface of the second longitudinal edge section, a second strip application arrangement arranged to attach an inside surface of a second longitudinal edge section of the protective strip onto an outside surface of a mid-section of the web, wherein the mid-section is placed between the first and second edge sections, thereby providing for that the food product is restrained from coming into contact with the cellulose-based mid-layer of the packaging material, a food product pipe arranged to fill the food product into the tube, a transversal sealing arrangement arranged to seal the tube transversally in transversal sealing sections in a lower end of the tube, and to cut the tube in the transversal sealing sections such that the packages are formed, and said kit of parts comprising an air heating arrangement comprising a first nozzle and a second nozzle, wherein the first nozzle is arranged to heat the first longitudinal edge section of the inside surface of the web by applying a first flow of heated air, and the second nozzle is arranged to heat a first longitudinal edge section of an outside surface of the protective strip by applying a second flow of heated air via a second nozzle.

The same features and advantages as presented above with respect to the first and second aspect also applies to this third aspect.

According to a fourth aspect, it is provided a method for preparing a web of packaging material and a protective strip before attaching these to each other, said method comprising receiving protective strip material data, determining a first temperature and/or a first volumetric flow rate based on the protective strip material data, controlling an air heating arrangement to expose the protective strip to a first flow of heated air via a first nozzle, wherein the first flow has the first temperature and/or the first volumetric flow rate, receiving packaging material data, determining a second temperature and/or a second volumetric flow rate based on the packaging material data, and controlling the air heating arrangement to expose the web to a second flow of heated air via a second nozzle, wherein the second flow has the second temperature and/or the second volumetric flow rate.

An advantage with this fourth aspect is that the risk of overheating the packaging material, thereby potentially causing blisters and/or delamination, can be reduced. It is also made possible to use less material in the web and/or the strip since the heating of the two can be fine-tuned more in detail when having information the packaging material and the protective strip material, respectively.

The information can be restricted to materials being used, but it is also possible to include production data for the protective strip material and/or the packaging material, i.e. weighing in production parameters.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
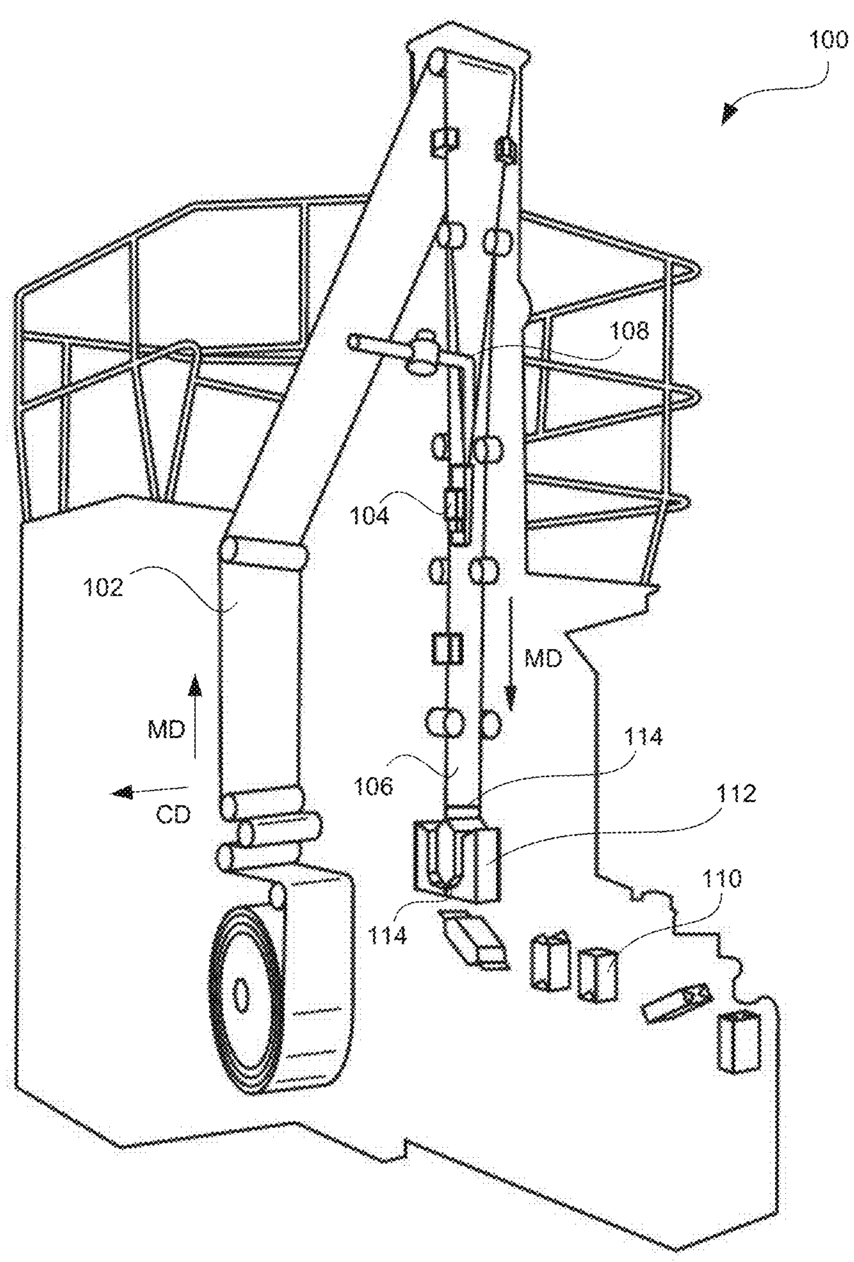
FIG. 1 is a perspective view of a roll-fed packaging machine.

FIG. 1 generally illustrates a packaging machine 100. In the illustrated example, the packaging machine 100 is a roll-fed carton packaging machine. The general principle of such a machine is that from a roll of packaging material PM, a web 102 is formed. Although not illustrated, if needed in order to fulfil food safety regulations, the web 102 may be sterilized using a hydrogen peroxide bath, a Low Voltage Electron Beam (LVEB) device or any other apparatus capable of reducing a number of unwanted microorganisms. After sterilization, by using a longitudinal sealing arrangement 104, the web 102 can be formed into a tube 106. When having formed the tube, a food product FP, for instance milk, can be fed into the tube 106 via a product pipe 108 placed at least partly inside the tube 106.

In order to form a package 110 from the tube 106 filled with food product FP, a transversal sealing can be made in a lower end of the tube by using a transversal sealing arrangement 112. Generally, this arrangement 112 has two main functions; 1) providing the transversal sealing, i.e. welding two opposite sides of the tube together such that the product in a lower part of the tube, placed downward the sealing arrangement, is separated from the product in the tube placed upward the sealing arrangement, and 2) cutting off the lower part of the tube such that the package 110 is formed. Alternatively, instead of providing the transversal sealing and cutting off the lower part in one and the same arrangement 112 as illustrated, the step of cutting off the lower part may be made in a subsequent step by a different piece of equipment, or by the consumer if the packages are intended to be sold in a multi-pack.

Figures 2A, 2B, 3A, 3B:
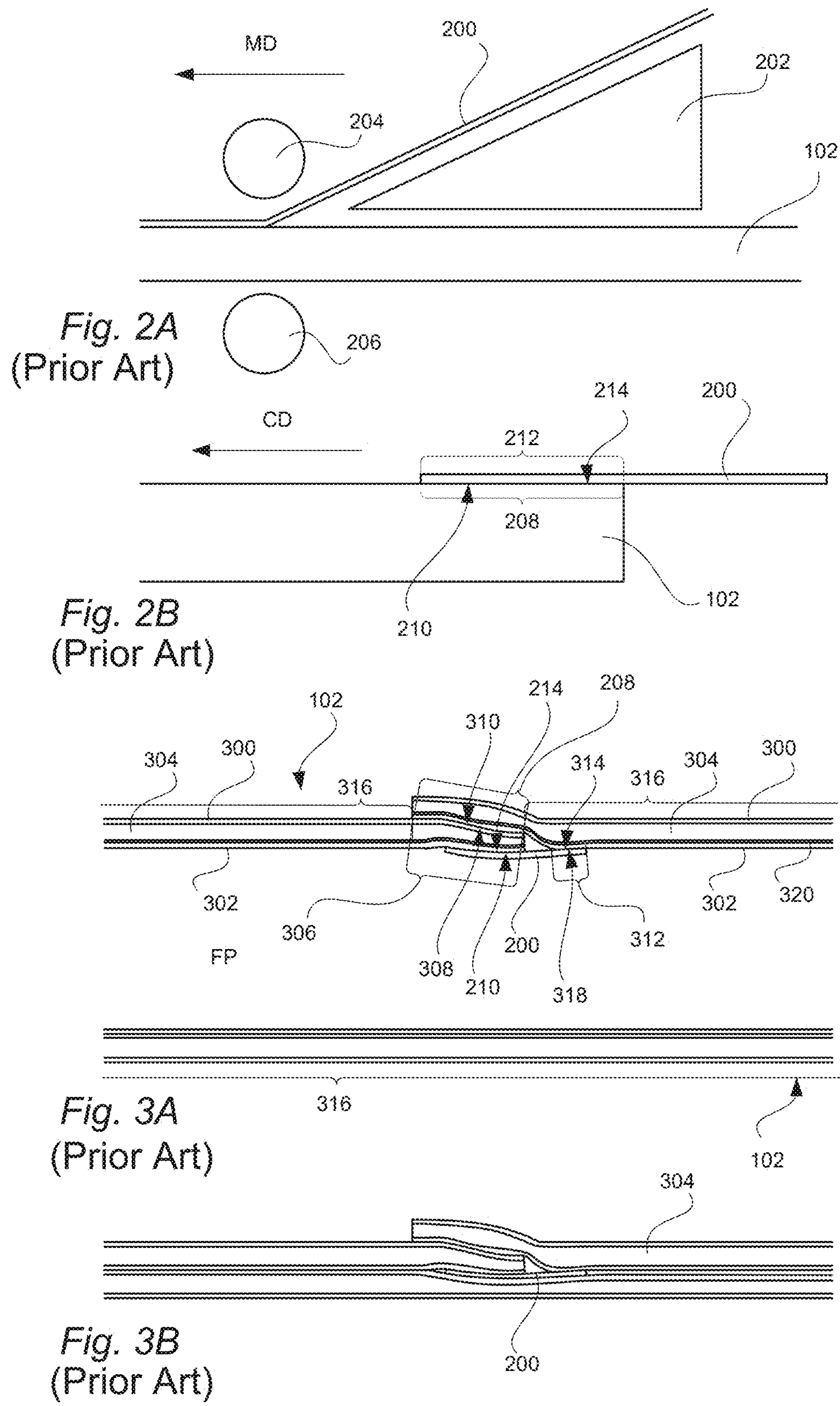
FIG. 2A is a cross-sectional view of a strip application process using induction heating seen from the machine direction MD.
FIG. 2B is a cross-sectional view of the web after the protective strip has been applied seen from the cross-direction CD.
FIG. 3A illustrates a cross-sectional view of part of a tube of packaging material after the strip has been applied and a longitudinal sealing has been made.
FIG. 3B illustrates a cross-sectional view of the tube in a transversal sealing section.
Figure 4:
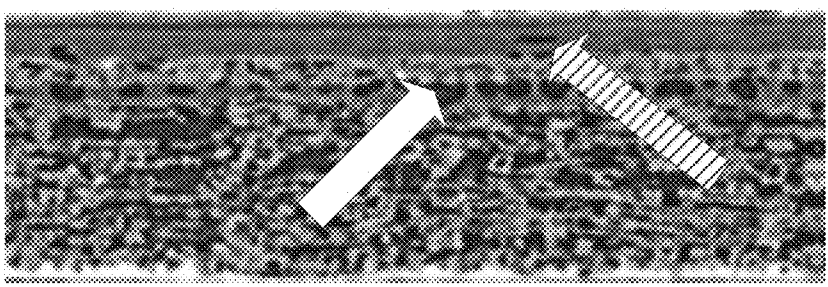
FIG. 4 to 7 illustrate four cross-sectional views of pieces of packaging material in which overheating has caused blisters and delamination by way of example.
Figure 5:
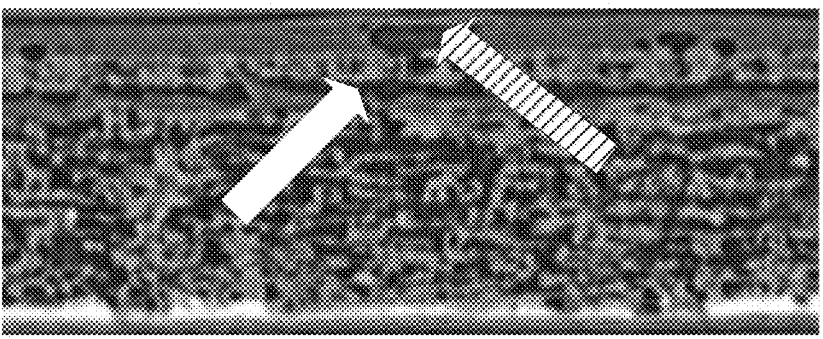
Figure 6:
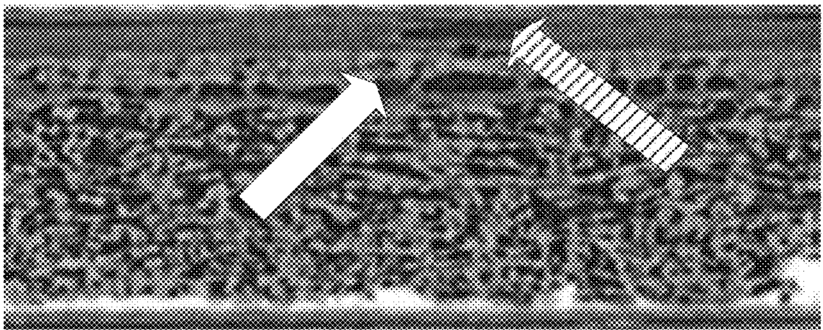
Figure 7:
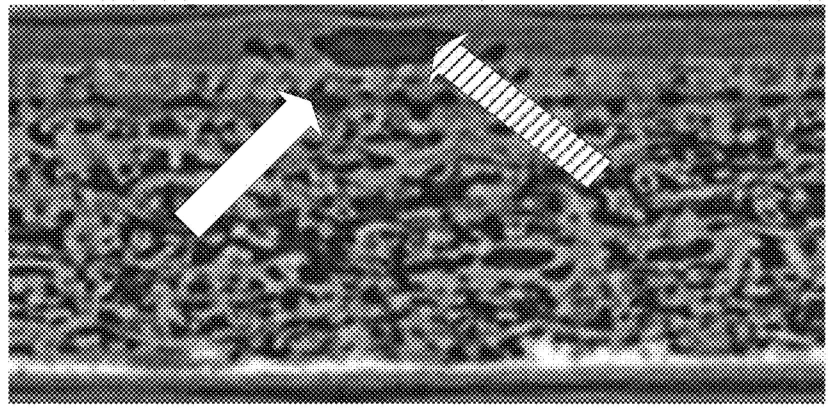

To provide for that the food product FP is hindered from coming in contact with a raw edge of the packaging material PM, a protective strip 200 may be applied onto to the web 102 as illustrated in FIGS. 2A and 2B. One way of providing for that the protective strip 200 and the web 102 can be attached to each other is to heat these by using an induction heating device 202. By heating the protective strip 200 and the web 102, the two at least partly melt. Once these have melted a pressure roller 204 in combination with a counter-pressure roller 206 can be used for pressing the web 102 and the protective strip 200 together such that the web 102 and the strip 200 adhere to one another.

As illustrated in FIG. 2B, once the protective strip 200 is attached to the web 102, a first longitudinal edge section 208 of the web 102 can be covered by a first longitudinal section 212 of the protective strip 200. The web 102 and the protective strip 200 can be attached to each other in that an outside surface 210 of the protective strip 200 in the first longitudinal section 212 is attached to an inside surface 214 of the web 102 in the first longitudinal edge section 208.

When the tube 102 is formed in the longitudinal sealing arrangement 104, the web 102, which may comprise an inner protective layer 300, an outer protective layer 302 and a cellulose-based mid-layer 304, can be folded such that the first longitudinal edge section 208 of the web 102 is placed inside a second longitudinal edge section 306 of the web 102, i.e. placed radially inwards, as illustrated by way of example in FIG. 3A. To provide the longitudinal sealing, an outside surface 308 of the first longitudinal edge section 208 can be attached to an inside surface 310 of the second longitudinal section 306 of the web 102. This attachment may be achieved by heating the two sections and by providing a pressure by using a pair of rollers similar to those illustrated in FIG. 2A.

In the longitudinal sealing arrangement 104, a second longitudinal edge section 312 of the strip 200 can be attached to the web 102 such the food product FP is hindered from coming into contact with the cellulose-based mid-layer 304. More particularly, an inside surface 314 of the second longitudinal edge section 312 of the strip 200 can be attached to an outside surface 318 of a mid-section 316 of the web 102, wherein the mid-section 316 is placed between the first and second longitudinal edge sections 208, 306 of the web 102.

In addition to the outer protective layer 300, which may be a polymer-based layer arranged to protect the cellulose-based mid-layer 304 from e.g. moisture, and the inner protective layer 302, which also may be a polymer-based layer, but arranged to protect the mid-layer 304 from the food product FP, the packaging material PM may comprise a barrier layer 320. A barrier layer may be an Aluminum foil, but it may also be e.g. a polymer-based layer and/or a barrier-coated film. A barrier layer 320, or a combination of such layers, serves for that oxygen is hindered from reaching the food product FP held in the packages 110.

As illustrated in FIG. 3B, in the transversal sealing sections 214, the tube 106 can be pressed together such that the protective strip 200 is also forming part of the transversal sealing sections 114.

A problem that may arise when using induction heating, as illustrated in FIG. 2A, for adhering the strip 200 to the web 102 is that the packaging material PM is negatively affected. For instance, as illustrated in FIGS. 4, 5, 6 and 7 by way of example, generating excessive heat during strip application may result in delamination, that is, the different layers of the packaging material PM release from each other or that one of the layers, e.g. the cellulose-based mid-layer 304, is transformed into several layers. In the FIGS. 4, 5, 6 and 7, examples of delamination is pointed to by white arrows.

Another unwanted affect that may be arise in the packaging material PM during the strip application process is that blisters are formed, pointed to by striped arrows in FIGS. 4, 5, 6 and 7. It has been found that this phenomena is of particular relevance when the cellulose-based mid-layer 304 is a carton layer or similar type of layer in which moisture can be present. When heat is added, the presence of moisture may result in that the blisters are formed.

The problem with the delamination and the blisters are that the packaging material PM is weakened and that food protecting properties of this may be deteriorate once the strip 200 has been applied. This may be less of a problem if the layers of the packaging material PM are even more deteriorated by e.g. the transversal sealing process performed in the transversal sealing arrangement 112, but as more efficient and well-controlled processes are provided in e.g. the transversal sealing arrangement 112 it has been found that the effects of the packaging material PM caused by the strip application also should be considered and taken into account for.

Figure 8:
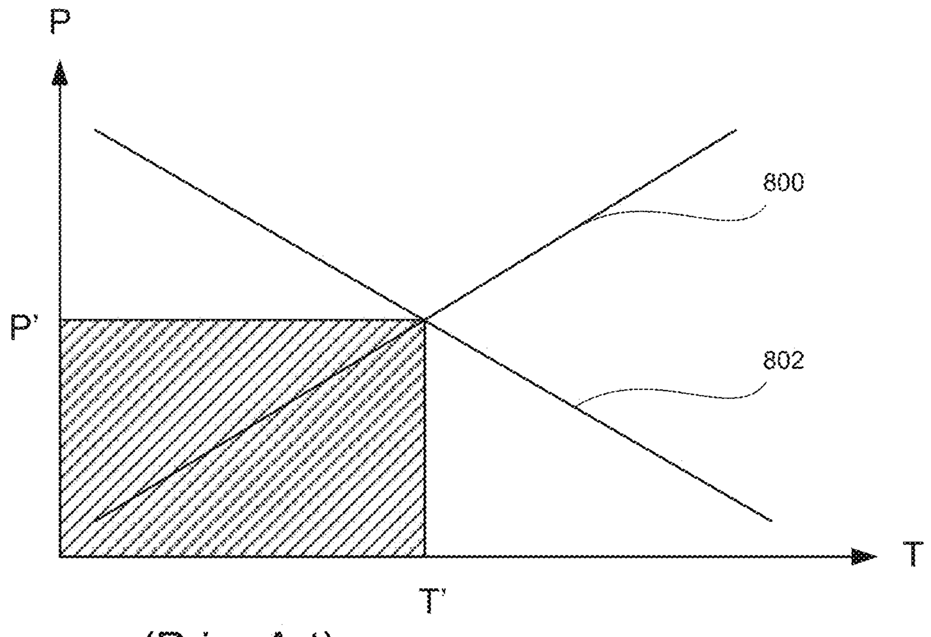
FIG. 8 illustrates a simplified model of how blisters and pin-holes are formed during the strip application process.

FIG. 8 illustrates a simplified model on how blisters and pin-holes, may be formed. Generally, if pressure P is held below a pressure threshold P' and temperature T is held below a temperature threshold T', no or at least few blisters and pinholes are formed. The thresholds P', T' can be determined by gauge pressure 800 and load bearing capacity of a polymer used for the strip 200.

Figure 9:
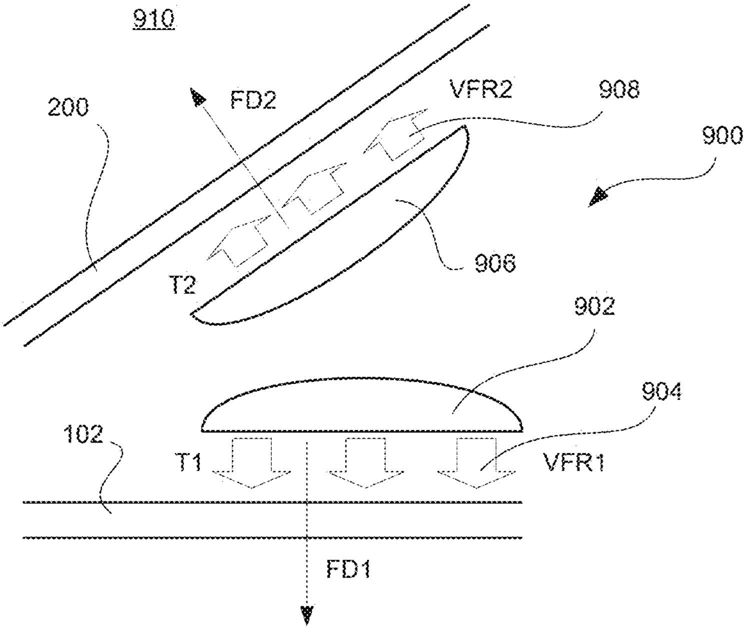
FIG. 9 generally illustrates an air heating arrangement.

To reduce any negative effects on the packaging material PM that may be caused as an effect of the strip application process, it has been found that an air heating arrangement 900 as generally illustrated in FIG. 9 can be used. Unlike present systems for strip application, the heating arrangement 900 provides individual heating of the strip 200 and the web 102. As illustrated, a first nozzle 902 may be used for providing a first flow 904 of heated air onto the web 102, and a second nozzle 906 may be used for providing a second flow 908 of heated air onto the strip 200.

By having individual temperatures, T1 for the first flow 90 and T2 for the second flow 904, it is made possible to provide sufficient heating for achieving melting of strip 200 and the web 102, respectively, such that the two can be adhered together reliably, at the same time as the risk of overheating, thereby causing blisters and delamination, can be held low. In addition to individually set the first and second temperatures T1, T2, also a first and a second volume flow rate VFR1, VFR2, may be set individually. Thus, instead of having different temperatures, it may be possible to achieve different heating by having different volume flow rates.

Even though not illustrated, by measuring humidity, temperature and/or pressure in surrounding air 910, this may be taken into account when setting the first and second temperatures T1, T2 and/or the first and second volume flow rates VFR1, VFR2.

As illustrated, the first flow 904 may be directed in a first flow direction FD1 and the second flow 904 may be directed in a second flow direction FD2. By having these directions diverted 90 degrees or more, it is made possible to reduce a risk that the web 102 is heated by the second flow 908 or a risk that the strip 200 is heated by the first flow 904, thereby ensuring adequate individual heating of the two.

Figure 10A:
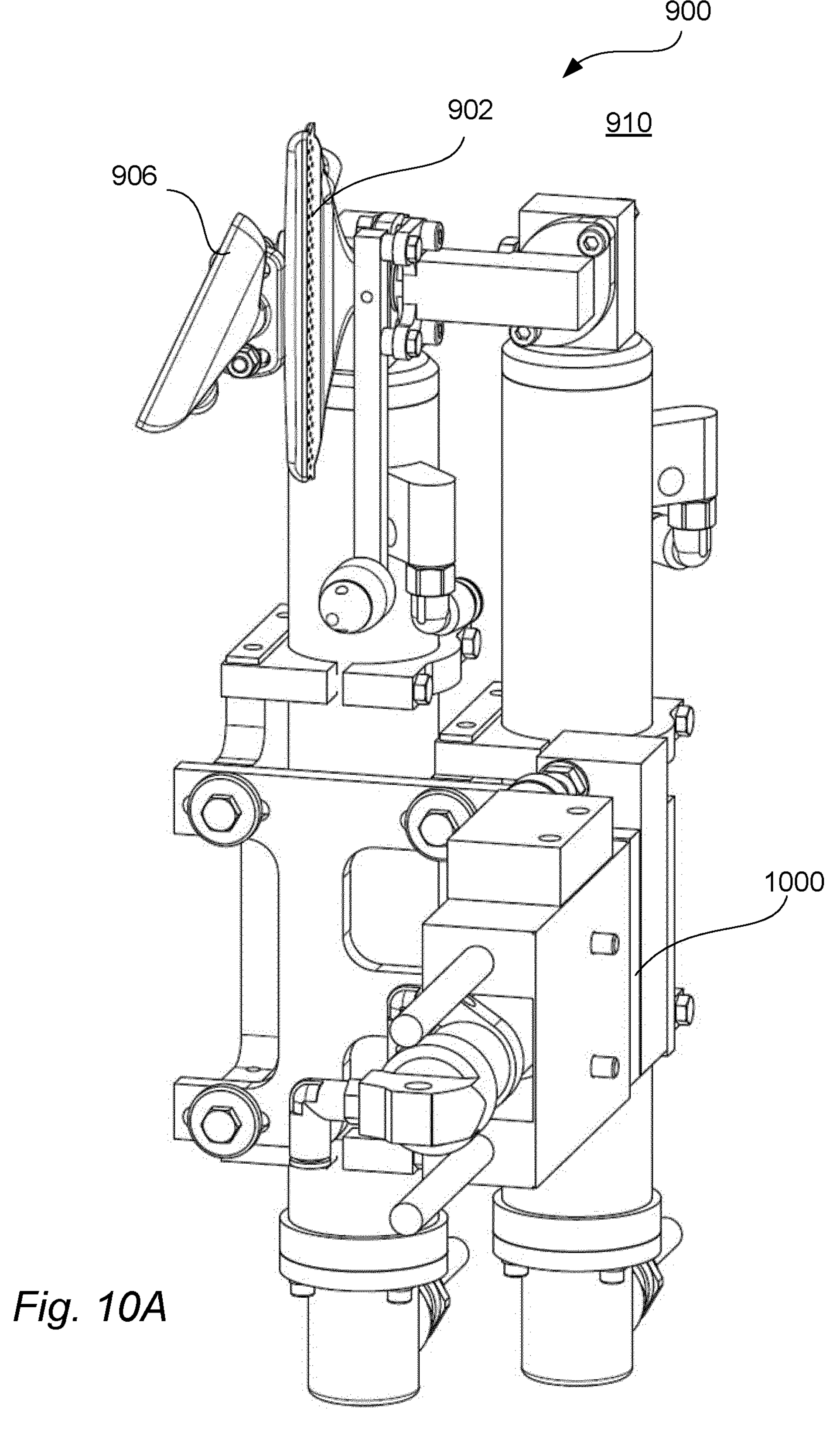
FIGS. 10A and 10B illustrate an example of an air heating arrangement that can be used for upgrading an existing filling machine.
Figure 10B:
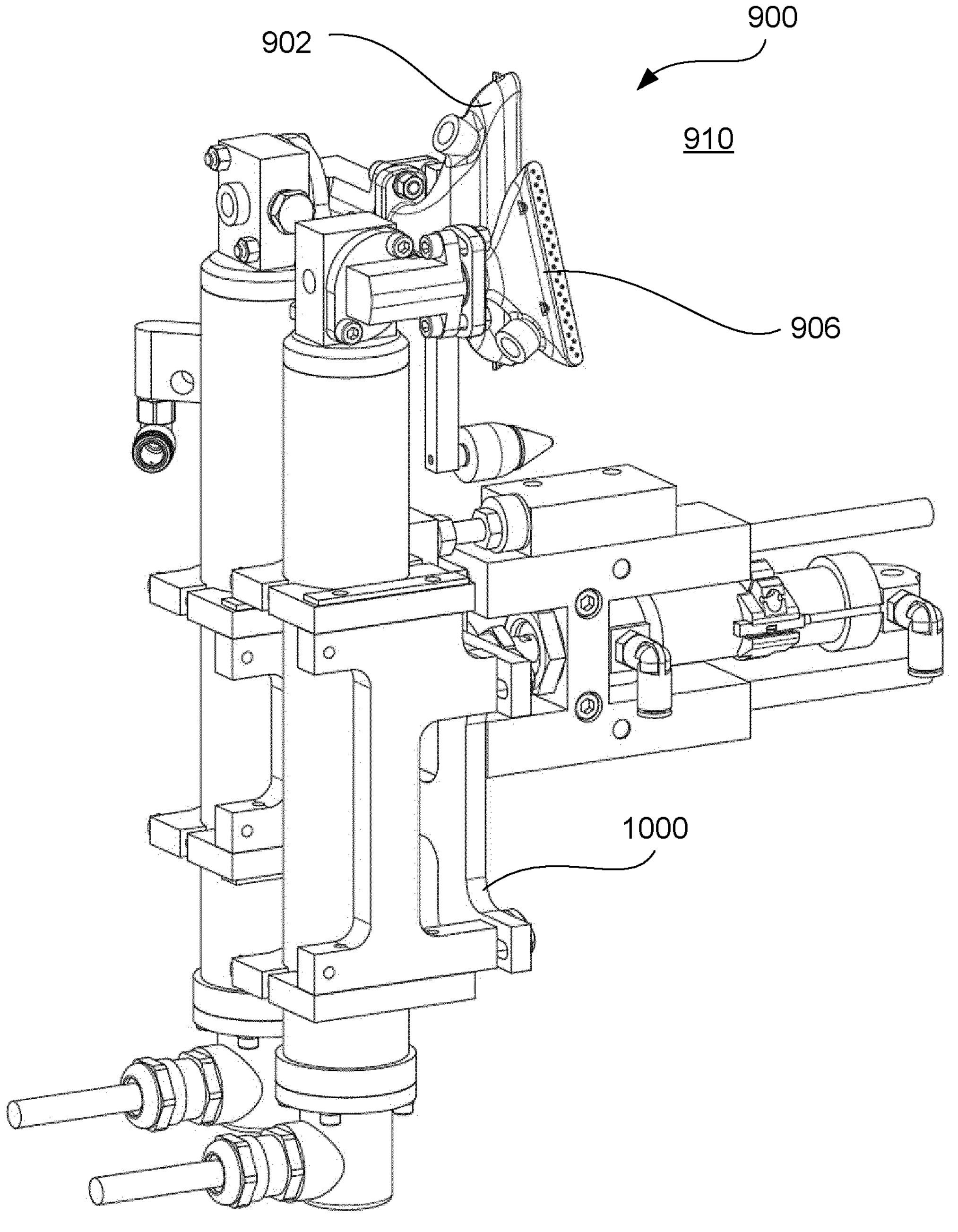

FIGS. 10A and 10B illustrate an example of the air heating arrangement 900 that can be attached to an existing apparatus 100. By applying this air heating arrangement 900 directly upstream a PM reel holder easily accessible on one side of the apparatus 100, the strip 200 and the web 102 may be heated and adhered to each other before the web 102 is fed into the apparatus 100 and thereby not easily accessible.

A mounting bracket 1000 can be provided such that the air heating arrangement 900 can easily be attached to the packaging machine 100. An advantage of having the air heating arrangement 900 placed on an outside of the packaging machine 100 and having the mounting bracket 1000, or other similar arrangement for providing easy installation, is that upgrading of existing filling machines is facilitated. An additional advantage of having the air heating arrangement 900 placed on the outside of the packaging machine 100 is that heating of the protective strip 200 and the web 102 can be monitored by an operator easily.

Figure 11:
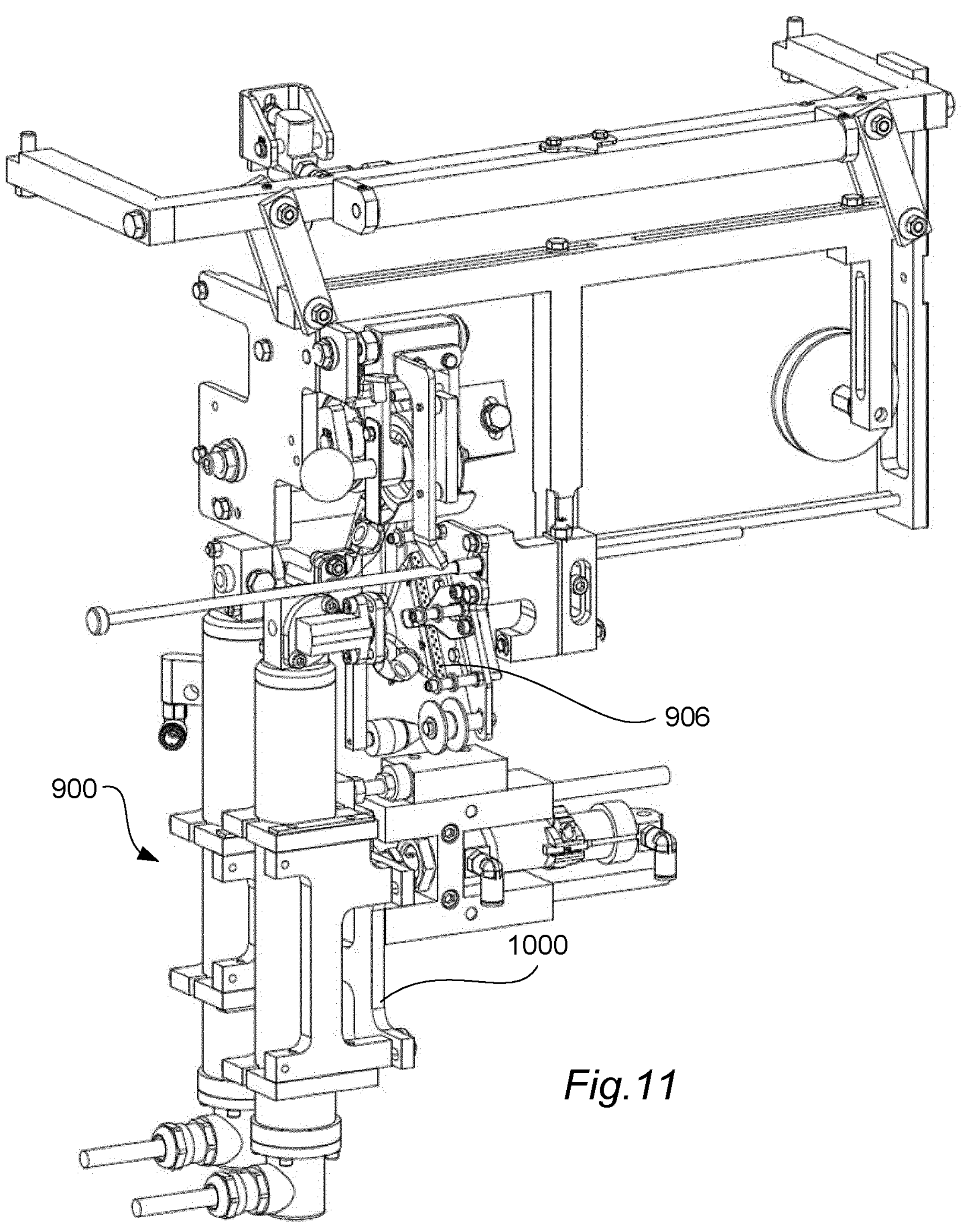
FIG. 11 illustrates by way of example of the heating arrangement illustrated in FIGS. 10A and 10B can be mounted in the filling machine.

FIG. 11 illustrates, also by way of example, the air heating arrangement 900, illustrated by way of example in FIGS. 10A and 10B, as well as parts of the packaging machine 100 arranged for feeding and directing the protective strip 200 such that this can be exposed to the heat via the second flow 908 from the second nozzle 906.

Figure 12:
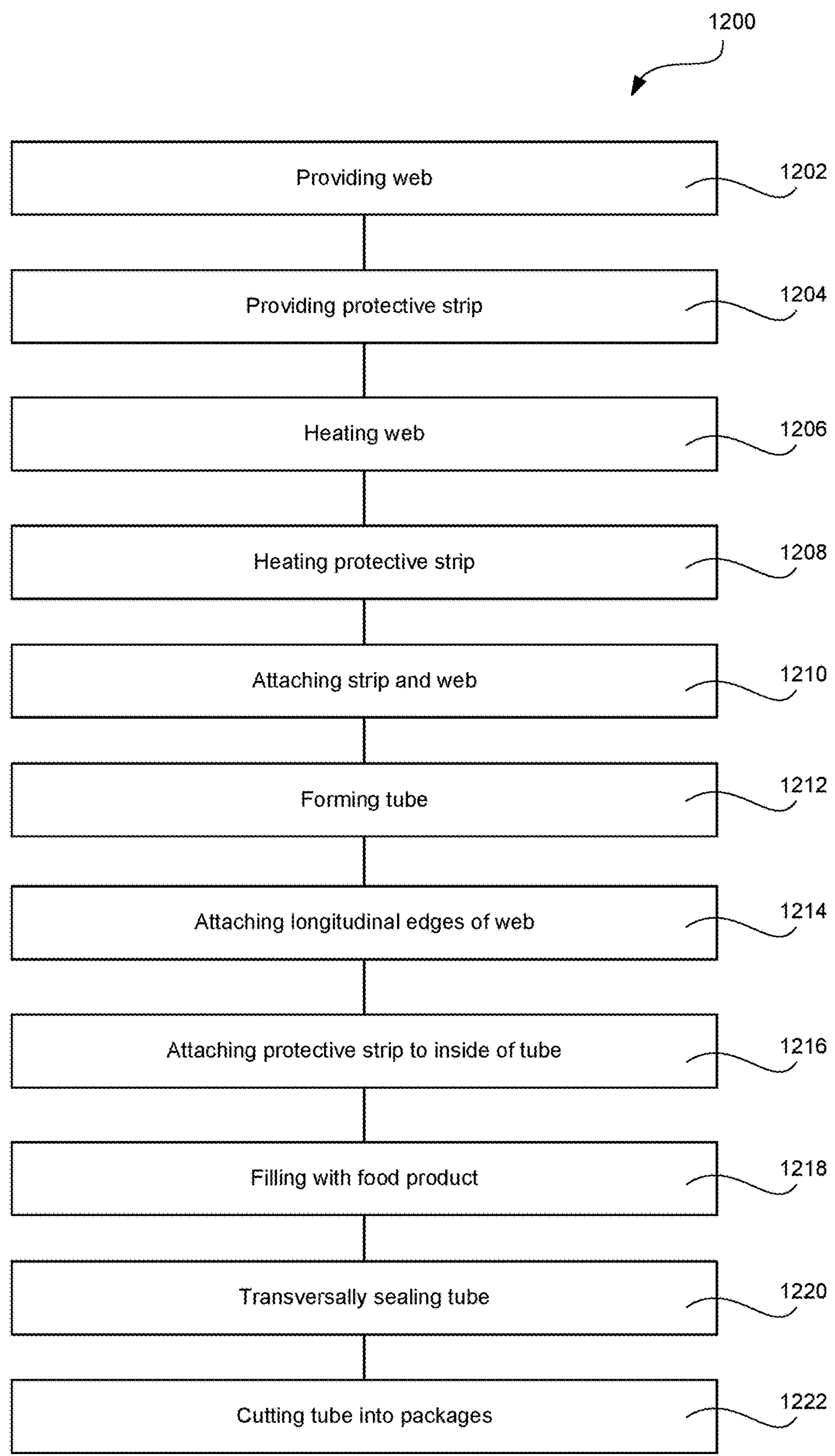
FIG. 12 is a flowchart illustrating a method for producing packages holding a food product.

FIG. 12 is a flowchart illustrating a method 1200 for producing packages 110 holding food product by way of example.

In a first step 1202, the web 102 can be provided, and in a second step 1204, the protective strip 200 can be provided.

In a third step 1206, the first longitudinal edge section 208 of the inside surface 214 of the web 102 can be heated by applying the first flow 904 of heated air via the first nozzle 902.

In a fourth step 1208, the first longitudinal edge section 212 of the inside surface 210 of the protective strip 200 can be heated by applying the second flow 908 of heated air via the second nozzle 906.

In a fifth step 1210, the outside surface 210 of the first longitudinal edge section 212 of the protective strip 200 can be attached onto the inside surface 214 of the first longitudinal edge section 212 of the web 102.

In a sixth step 1212, the tube 106 can be formed from the web 102 of packaging material (PM) by directing the first longitudinal edge section 208 of the web 102 inside the second longitudinal edge section 306 of the web 102.

In a seventh step 1214, the outside surface 308 of the first longitudinal edge section 208 can be attached onto the inside surface 310 of the second longitudinal edge section 306.

In an eighth step 1216, the inside surface 314 of the second longitudinal section 312 of the protective strip 200 can be attached onto the outside surface 318 of the mid-section 316 of the web 102, wherein the mid-section 316 can be placed between the first and second edge sections 208, 306, thereby providing for that the food product (FP) can be hindered from coming into contact with the cellulose-based mid-layer 304 of the packaging material (PM).

In a ninth step 1218, the food product (FP) can be filled into the tube 106.

In a tenth step 1220, the tube 106 can be transversally sealed in transversal sealing sections 114 in a lower end of the tube 106.

In an eleventh step 1222, the tube 106 can be cut in the transversal sealing sections 114 such that the packages 110 are formed.

Even though described in a particular order, the different steps may also be performed in other orders and also some of the steps may be performed in parallel, e.g. the web and the protective strip may be heated in parallel.

Figure 13:
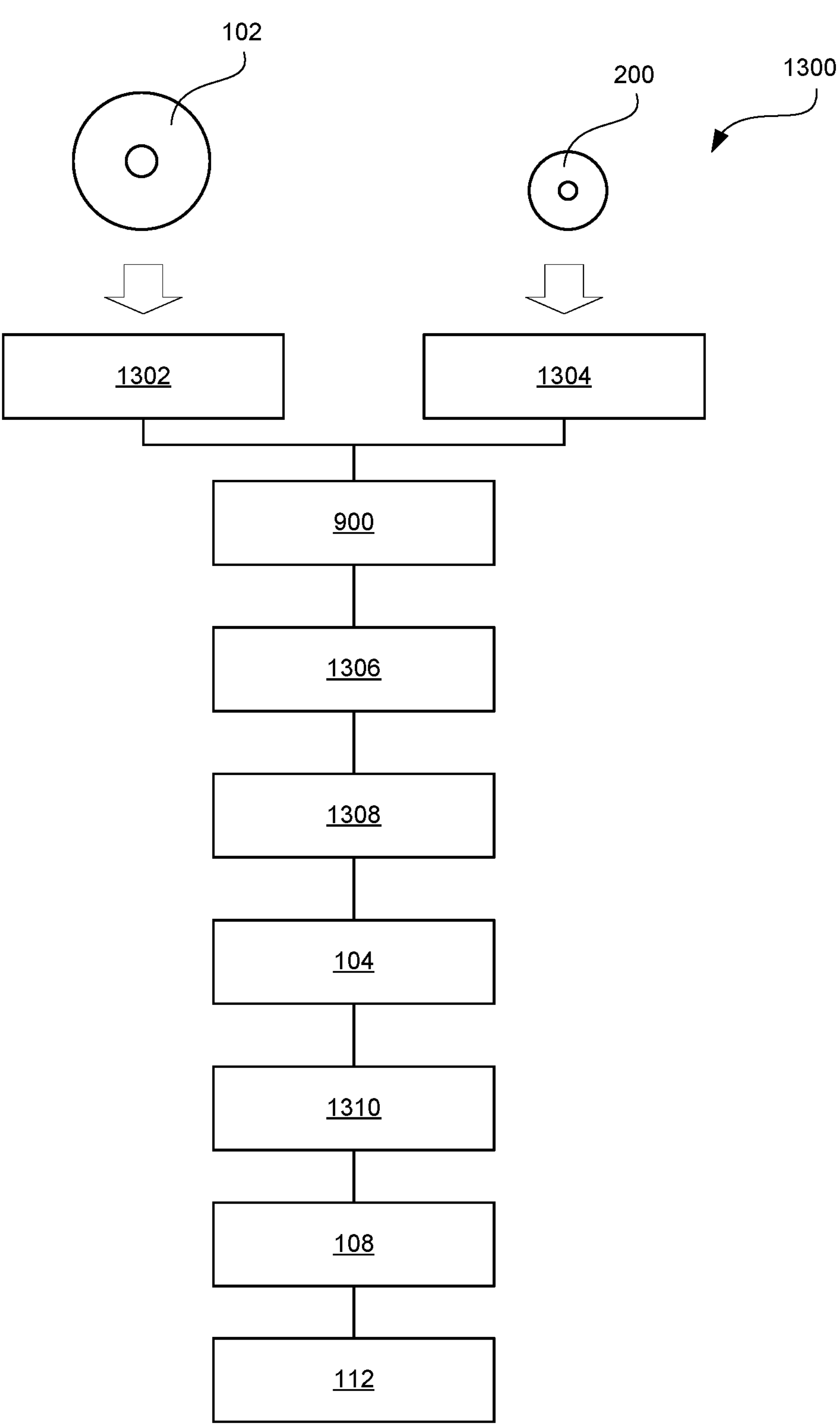
FIG. 13 generally illustrates an apparatus for producing packages holding a food product.

FIG. 13 generally illustrates an apparatus 1300 for producing packages 110 holding food product FP. The apparatus can comprise a web holder 1302 arranged to hold the web 102 of packaging material PM comprising at least the outer protective layer 300, the cellulose-based mid-layer 304 and the inner protective layer 302. Further, the apparatus may comprise a protective strip holder 1304 arranged to hold a protective strip (200). The apparatus 1300 may further comprise the air heating arrangement 900, illustrated by way of example in FIGS. 10A, 10B and 11, comprising the first nozzle 902 and the second nozzle 906, wherein the first nozzle 902 can be arranged to heat the first longitudinal edge section 208 of the inside surface 214 of the web 102 by applying the first flow 904 of heated air, and the second nozzle 906 can be arranged to heat the first longitudinal edge section 212 of the outside surface 210 of the protective strip 200 by applying the second flow 908 of heated air via the second nozzle 906. Still further, it may be provided a first strip application arrangement 1306 arranged to attach the outside surface 210 of the first longitudinal edge section 212 of the protective strip 200 onto the inside surface 214 of the first longitudinal edge section 208 of the web 102. A tube forming arrangement 1308 may be arranged to form the tube 106 of the web 102 of packaging material PM by directing the first longitudinal edge section 208 inside the second longitudinal edge section 306 of the web 102. The apparatus may also comprise the longitudinal sealing arrangement 104 arranged to seal the web 102 longitudinally by attaching the outside surface 308 of the first longitudinal edge section 208 onto the inside surface 310 of the second longitudinal edge section 306. In addition, it may be provided a second strip application arrangement 1310 arranged to attach the inside surface 314 of the second longitudinal edge section 312 of the protective strip 200 onto the outside surface 318 of the mid-section 316 of the web 102, wherein the mid-section 316 is placed between the first and second edge sections 208, 306, thereby providing for that the food product FP is restrained, or hindered, from coming into contact with the cellulose-based mid-layer 304 of the packaging material PM. In addition, the food product pipe 108 may be arranged to fill the food product FP into the tube 106, and also the apparatus 1300 can comprise the transversal sealing arrangement 112 arranged to seal the tube 106 transversally in transversal sealing sections 114 in the lower end of the tube 106, and to cut the tube 106 in the transversal sealing sections 114 such that the packages 110 are formed.

Figure 14:
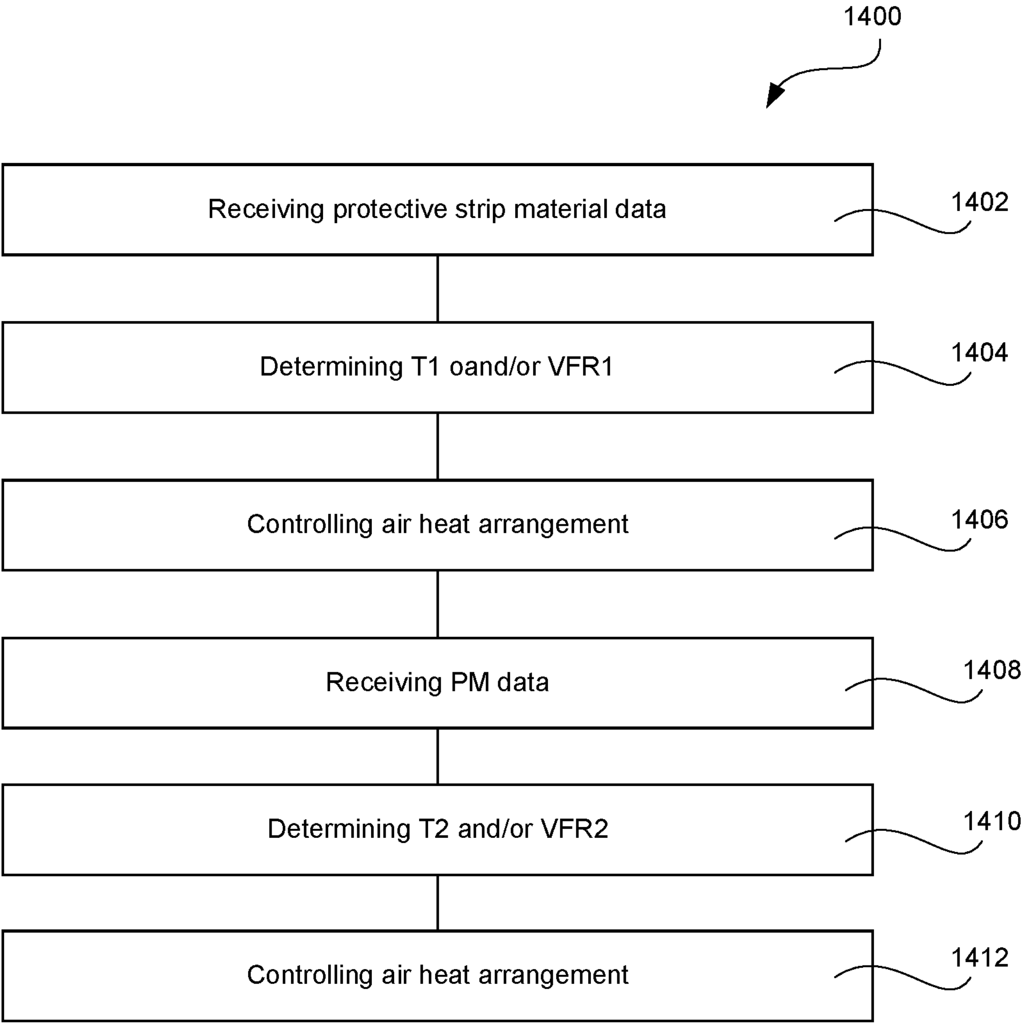
FIG. 14 is a flowchart illustrating a method for preparing a web of packaging material and a protective strip before attaching these together.

FIG. 14 is a flowchart illustrating a method 1400 for preparing the web 102 of packaging material PM and a protective strip 200 before attaching these to each other. In a first step 1402, protective strip material data can be received. In a second step 1404, a first temperature T1 and/or a first volumetric flow rate VFR1 based on the protective strip material data can be determined. In a third step 1406, the air heating arrangement 900 can be controlled to expose the protective strip 200 to the first flow 904 of heated air via the first nozzle 902, wherein the first flow 904 has the first temperature T1 and/or the first volumetric flow rate VFR1. In a fourth step 1408, packaging material data can be received. In a fifth step 1410, a second temperature T2 and/or a second volumetric flow rate VFR2 can be determined based on the packaging material data. In a sixth step 1412, the air heating arrangement 900 can be controlled to expose the web 102 to the second flow 908 of heated air via the second nozzle 906, wherein the second flow 908 has the second temperature T2 and/or the second volumetric flow rate VFR2.

Even though described in a particular order, the different steps may also be performed in other orders and also some of the steps may be performed in parallel, e.g. the web and the protective strip may be heated in parallel.

From the description above follows that, although various embodiments of the invention have been described and shown, the invention is not restricted thereto, but may also be embodied in other ways within the scope of the subject-matter defined in the following claims.

The invention claimed is:

1. A method for producing packages holding a food product, said method comprising providing a web of packaging material comprising at least an outer protective layer, a cellulose-based mid-layer and an inner protective layer, providing a protective strip, heating a first longitudinal edge section of an inside surface of the web by applying a first flow of heated air via a first nozzle, heating a first longitudinal edge section of an outside surface of the protective strip by applying a second flow of heated air via a second nozzle, the second flow of heated air being different from the first flow of heated air, attaching the outside surface of the first longitudinal edge section of the protective strip onto the inside surface of the first longitudinal edge section of the web, forming a tube of the web of packaging material by directing the first longitudinal edge section of the web inside a second longitudinal edge section of the web, attaching an outside surface of the first longitudinal edge section of the web onto an inside surface of the second longitudinal edge section of the web, attaching an inside surface of a second longitudinal section of the protective strip onto an outside surface of a mid-section of the web, wherein the mid-section of the web is placed between the first and second edge sections of the web, thereby providing for that the food product is hindered from coming into contact with the cellulose-based mid-layer of the packaging material, filling the food product into the tube, sealing the tube transversally in transversal sealing sections in a lower end of the tube, and cutting the tube in the transversal sealing sections such that the packages are formed, wherein the first flow of heated air has a first temperature, and the second flow of heated air has a second temperature, wherein the first temperature is adjusted in accordance with properties of the packaging material, and the second temperature is adjusted in accordance with properties of the protective strip, and wherein the first and second temperatures are set based on measured humidity level, measured pressure and/or measured temperature in surrounding air.

2. The method according to claim 1, wherein the first temperature is in the range 50 to 90 degrees Celsius and/or the second temperature is in the range 70 to 250 degrees Celsius.

3. The method according to claim 1, wherein the first flow of heated air provided via the first nozzle is directed in a first flow direction and the second flow of heated air provided via the second nozzle is directed in a second flow direction, and the first and second flow directions are diverted at least 90 degrees.

4. The method according to claim 1, wherein the first flow of heated air has a first volumetric flow rate, and the second flow of heated air has a second volumetric flow rate, wherein the first volumetric flow rate is adjusted in accordance with properties of the packaging material, and the second volumetric flow rate is adjusted in accordance with properties of the protective strip.

5. The method according to claim 4, wherein the web of packaging material further comprising a barrier layer arranged between the outer protective layer and the inner protective layer, wherein the barrier layer provides for that oxygen is hindered from passing through the packaging material into the food product, wherein the first temperature of the first flow and/or the first volumetric flow rate are adjusted such that negative impact on the packaging material and the barrier layer is prevented.

6. The method according to claim 4, wherein the first and second volumetric flow rate are set based on measured humidity level, measured pressure and/or measured temperature in surrounding air.

7. An apparatus for producing packages holding a food product, said apparatus comprising a web holder arranged to hold a web of packaging material comprising at least an outer protective layer, a cellulose-based mid-layer and an inner protective layer, a protective strip holder arranged to hold a protective strip, an air heating arrangement comprising a first nozzle and a second nozzle, wherein the first nozzle is arranged to heat a first longitudinal edge section of an inside surface of the web by applying a first flow of heated air, and the second nozzle is arranged to heat a first longitudinal edge section of an outside surface of the protective strip by applying a second flow of heated air via a second nozzle, the second flow of heated air being different from the first flow of heated air, a first strip application arrangement arranged to attach the outside surface of the first longitudinal edge section of the protective strip onto the inside surface of the first longitudinal edge section of the web, a tube forming arrangement arranged to form a tube of the web of packaging material by directing the first longitudinal edge section of the web inside a second longitudinal edge section of the web, a longitudinal sealing arrangement arranged to seal the web longitudinally by attaching an outside surface of the first longitudinal edge section of the web onto an inside surface of the second longitudinal edge section of the web, a second strip application arrangement arranged to attach an inside surface of a second longitudinal edge section of the protective strip onto an outside surface of a mid-section of the web, wherein the mid-section of the web is placed between the first and second edge sections of the web, thereby providing for that the food product is restrained from coming into contact with the cellulose-based mid-layer of the packaging material, a food product pipe arranged to fill the food product into the tube, a transversal sealing arrangement arranged to seal the tube transversally in transversal sealing sections in a lower end of the tube, and to cut the tube in the transversal sealing sections such that the packages are formed, wherein the first flow of heated air has a first temperature, and the second flow of heated air has a second temperature, wherein the first temperature is adjusted in accordance with properties of the packaging material, and the second temperature is adjusted in accordance with properties of the protective strip, wherein the first and second temperature are set based on measured humidity level, measured pressure and/or measured temperature in surrounding air.

8. The apparatus according to claim 7, wherein the first flow of heated air provided via the first nozzle is directed in a first flow direction and the second flow of heated air provided via the second nozzle is directed in a second flow direction, and the first and second flow directions are diverted at least 90 degrees.

9. The apparatus according to claim 7, wherein the first flow of heated air has a first volumetric flow rate, and the second flow of heated air has a second volumetric flow rate, wherein the first volumetric flow rate is adjusted in accordance with properties of the packaging material, and the second volumetric flow rate is adjusted in accordance with properties of the protective strip.

10. The apparatus according to claim 9, wherein the web of packaging material further comprising a barrier layer arranged between the outer protective layer and the inner protective layer, wherein the barrier layer provides for that oxygen is hindered from passing through the packaging material into the food product, wherein the first temperature of the first flow and/or the first volumetric flow rate are adjusted such that negative impact on the packaging material and the barrier layer is prevented.

11. The apparatus according to claim 9, wherein the first and second volumetric flow rate are set based on measured humidity level in surrounding air, measured pressure and/or measured temperature in surrounding air.

12. A kit of parts arranged to be mounted onto an existing filling machine, said existing filling machine comprising a web holder arranged to hold a web of packaging material comprising at least an outer protective layer, a cellulose-based mid-layer and an inner protective layer, a protective strip holder arranged to hold a protective strip, a first strip application arrangement arranged to attach an outside surface of a first longitudinal edge section of the protective strip onto an inside surface of a first longitudinal edge section of the web, a tube forming arrangement arranged to form a tube of the web of packaging material by directing the first longitudinal edge section of the web inside a second longitudinal edge section of the web, a longitudinal sealing arrangement arranged to seal the web longitudinally by attaching an outside surface of the first longitudinal edge section of the web onto an inside surface of the second longitudinal edge section of the web, a second strip application arrangement arranged to attach an inside surface of a second longitudinal edge section of the protective strip onto an outside surface of a mid-section of the web, wherein the mid-section of the web is placed between the first and second edge sections of the web, thereby providing for that the food product is restrained from coming into contact with the cellulose-based mid-layer of the packaging material, a food product pipe arranged to fill the food product into the tube, a transversal sealing arrangement arranged to seal the tube transversally in transversal sealing sections in a lower end of the tube, and to cut the tube in the transversal sealing sections such that the packages are formed, and said kit of parts comprising an air heating arrangement comprising a first nozzle and a second nozzle, wherein the first nozzle is arranged to heat the first longitudinal edge section of the inside surface of the web by applying a first flow of heated air, and the second nozzle is arranged to heat a first longitudinal edge section of an outside surface of the protective strip by applying a second flow of heated air via the second nozzle, the second flow of heated air being different from the first flow of heated air, wherein the first flow of heated air has a first temperature, and the second flow of heated air has a second temperature, wherein the first temperature is adjusted in accordance with properties of the packaging material, and the second temperature is adjusted in accordance with properties of the protective strip, wherein the first and second temperature are set based on measured humidity level, measured pressure and/or measured temperature in surrounding air.

13. A method for preparing a web of packaging material and a protective strip before attaching these to each other, said method comprising receiving protective strip material data, determining a first temperature and/or a first volumetric flow rate based on the protective strip material data, controlling an air heating arrangement to expose the protective strip to a first flow of heated air via a first nozzle, wherein the first flow has the first temperature and/or the first volumetric flow rate, receiving packaging material data, determining a second temperature and/or a second volumetric flow rate based on the packaging material data, and controlling the air heating arrangement to expose the web to a second flow of heated air via a second nozzle, wherein the second flow has the second temperature and/or the second volumetric flow rate.

14. A method for producing packages holding a food product, said method comprising providing a web of packaging material comprising at least an outer protective layer, a cellulose-based mid-layer and an inner protective layer, providing a protective strip, heating a first longitudinal edge section of an inside surface of the web by applying a first flow of heated air via a first nozzle, heating a first longitudinal edge section of an outside surface of the protective strip by applying a second flow of heated air via a second nozzle, the second flow of heated air being different from the first flow of heated air, attaching the outside surface of the first longitudinal edge section of the protective strip onto the inside surface of the first longitudinal edge section of the web, forming a tube of the web of packaging material by directing the first longitudinal edge section of the web inside a second longitudinal edge section of the web, attaching an outside surface of the first longitudinal edge section of the web onto an inside surface of the second longitudinal edge section of the web, attaching an inside surface of a second longitudinal section of the protective strip onto an outside surface of a mid-section of the web, wherein the mid-section of the web is placed between the first and second edge sections of the web, thereby providing for that the food product is hindered from coming into contact with the cellulose-based mid-layer of the packaging material, filling the food product into the tube, sealing the tube transversally in transversal sealing sections in a lower end of the tube, and cutting the tube in the transversal sealing sections such that the packages are formed, wherein the first flow of heated air has a first volumetric flow rate, and the second flow of heated air has a second volumetric flow rate, wherein the first volumetric flow rate is adjusted in accordance with properties of the packaging material, and the second volumetric flow rate is adjusted in accordance with properties of the protective strip, and wherein the first and second volumetric flow rate are set based on measured humidity level, measured pressure and/or measured temperature in surrounding air.

15. An apparatus for producing packages holding a food product, said apparatus comprising a web holder arranged to hold a web of packaging material comprising at least an outer protective layer, a cellulose-based mid-layer and an inner protective layer, a protective strip holder arranged to hold a protective strip, an air heating arrangement comprising a first nozzle and a second nozzle, wherein the first nozzle is arranged to heat a first longitudinal edge section of an inside surface of the web by applying a first flow of heated air, and the second nozzle is arranged to heat a first longitudinal edge section of an outside surface of the protective strip by applying a second flow of heated air via a second nozzle, the second flow of heated air being different from the first flow of heated air, a first strip application arrangement arranged to attach the outside surface of the first longitudinal edge section of the protective strip onto the inside surface of the first longitudinal edge section of the web, a tube forming arrangement arranged to form a tube of the web of packaging material by directing the first longitudinal edge section of the web inside a second longitudinal edge section of the web, a longitudinal sealing arrangement arranged to seal the web longitudinally by attaching an outside surface of the first longitudinal edge section of the web onto an inside surface of the second longitudinal edge section of the web, a second strip application arrangement arranged to attach an inside surface of a second longitudinal edge section of the protective strip onto an outside surface of a mid-section of the web, wherein the mid-section of the web is placed between the first and second edge sections of the web, thereby providing for that the food product is restrained from coming into contact with the cellulose-based mid-layer of the packaging material, a food product pipe arranged to fill the food product into the tube, a transversal sealing arrangement arranged to seal the tube transversally in transversal sealing sections in a lower end of the tube, and to cut the tube in the transversal sealing sections such that the packages are formed, wherein the first flow of heated air has a first volumetric flow rate, and the second flow of heated air has a second volumetric flow rate, wherein the first volumetric flow rate is adjusted in accordance with properties of the packaging material, and the second volumetric flow rate is adjusted in accordance with properties of the protective strip, and wherein the first and second volumetric flow rate are set based on measured humidity level, measured pressure and/or measured temperature in surrounding air.

* * * * *